United States Patent [19]

Riley et al.

[11] Patent Number: 4,556,082
[45] Date of Patent: Dec. 3, 1985

[54] REMOVABLE THERMAL INSULATION JACKET FOR VALVES AND FITTINGS

[75] Inventors: James E. Riley, Auburn; Neil W. Tyson, Opelika, both of Ala.

[73] Assignee: Energy Systems, Inc., Auburn, Ala.

[21] Appl. No.: 523,650

[22] Filed: Aug. 16, 1983

[51] Int. Cl.[4] .............................................. F16L 59/16
[52] U.S. Cl. ...................................... 137/375; 138/149; 285/47
[58] Field of Search .................... 138/149; 285/47; 137/375

[56] References Cited

U.S. PATENT DOCUMENTS

| | | | |
|---|---|---|---|
| 3,346,016 | 10/1967 | Blau et al. | 138/149 |
| 3,614,967 | 10/1971 | Royston | 138/149 |
| 3,665,968 | 5/1972 | DePutter | 138/149 |
| 3,728,187 | 4/1973 | Martin | 138/149 |
| 4,063,775 | 12/1977 | Merz | 138/149 |
| 4,112,967 | 9/1978 | Withem | 137/375 |
| 4,207,918 | 6/1980 | Burns et al. | 137/375 |
| 4,307,756 | 12/1981 | Voigt et al. | 138/149 |

*Primary Examiner*—A. Michael Chambers
*Attorney, Agent, or Firm*—Newton, Hopkins & Ormsby

[57] ABSTRACT

A unitary flexible thermal insulation jacket for valves and pipe fittings is disclosed. The jacket is universal in the sense that it properly fits valves and pipe fittings of various manufacturers. It is secured snugly in enclosing to a valve or pipe fitting by attached draw cords, rendering the jacket readily removable, reusable and thermally efficient.

16 Claims, 7 Drawing Figures

REMOVABLE THERMAL INSULATION JACKET FOR VALVES AND FITTINGS

BACKGROUND OF THE INVENTION

The prior patented art and commercial art contains teachings relating to insulating enclosures for valves and pipe fittings used in steam service and certain process industries. The prior art devices vary considerably in their natures, ranging from rigid modular enclosures through semi-rigid and flexible insulating enclosures.

For example, prior U.S. Pat. No. 4,207,918, issued Jan. 17, 1980, discloses a flexible insulation jacket for valves formed in several cooperating sections which are secured in assembled relationship on a valve by straps and buckles plus additional forms of releasable fasteners. The patented structure is rather complex and comparatively costly. Due to its modular form, it tends not to be universal in terms of compatibility with valves of different manufacturers.

U.S. Pat. No. 4,112,967, issued Sept. 12, 1978 shows a further example of the prior art. This patented structure possesses generally the same drawbacks noted above in connection with U.S. Pat. No. 4,207,918. Neither prior patent discloses a unitary universal insulating jacket for valves and pipe fittings which is entirely flexible and initially flat before being applied to a valve or fitting, and which utilizes convenient drawstrings for tightly but removably attaching the jacket to a valve or fitting in an almost airtight engagement with opposing rigid surfaces and contours of the valve or fitting.

Another known prior art structure for the thermal insulation of valves is manufactured and sold by Hitco Insulation Products, subsidiary of Armco, 1600 W. 135th St., Gardena, Calif. 90249. The Hitco product is a semi-flexible insulation jacket or blanket which is manually compressed and shaped to roughly conform to the external contours of a valve, and then tied in place by lacing wires which are engaged with headed pins fixed to the exterior of the device. The prior art structure is more costly than the flexible insulation jacket according to the present invention and is much less convenient to use, and does not have the ability of the invention to be drawn into tight sealing relationship with a valve or fitting while conforming snugly with its external contours, by virtue of draw cords. The present invention is therefore thought to be a very significant advance over all of the above prior art devices for a broadly similar purpose.

SUMMARY OF THE INVENTION

The present invention is a readily removable thermal insulation jacket for valves and other fittings consisting of a unitary, non-modular design incorporating draw cords. The non-modular design results from the use of a single piece of flexible insulation material enclosed within a single enclosure of supporting material. The jacket is adapted to assume a substantially flat configuration before application and readily conformable to the contours of a valve or fitting when wrapped around the same.

A tight fit about the valve or fitting to be insulated is insured through careful design for insulation and fabric patterns and through the use of the draw cords. The draw cords are arranged such that when tied properly, the edges of the jackets are sealed against the insulated fitting and adjacent pipe surfaces. The result is a universal jacket fitting all valves and other fittings of a specific type, size and pressure rating, regardless of the fitting's manufacturer.

It is, therefore, the primary object of the present invention to provide a unitary, non-modular removable thermal insulation jacket which may be applied to specific fittings regardless of their manufacturer.

Another object of the present invention is to provide a thermal insulation jacket which will allow for reduced manufacturing and materials costs through simplified design.

A still further objective of the present invention is to provide a thermal insulation jacket which is easily installed on and easily removed from a fitting.

Other features and advantages of the invention will become apparent to those skilled in the art during the course of the following detailed description.

BRIEF DESCRIPTION OF THE DRAWINGS

FIG. 45 is a similar view of an insulation jacket for a gate valve such as the valve shown in FIG. 1;

DETAILED DESCRIPTION

Figure 2:
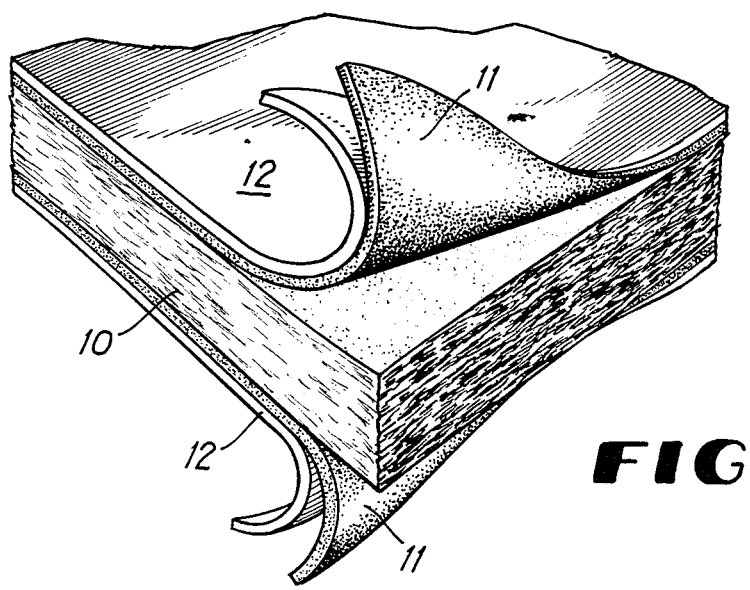
FIG. 2 is an enlarged fragmentary partly exploded perspective view of the insulation jacket.

Referring to the drawings in detail wherein like numerals designate like parts, an insulation jacket according to the invention is illustrated in FIG. 2 and comprises a thick internal unitary layer 10 of thermal insulation, such as a 1" thick layer of mechanically needled fiberglass. The insulation layer 10 contains no binders. On opposite sides of the insulation layer 10 and completely covering it are backing sheets 11 of silicone rubber. Outwardly of these backing sheets and forming the outer surface members of the insulation jacket are sheets 12 of aluminized fiberglass cloth. Preferably, the cover sheet material employed has the silicone rubber backing laminated to the aluminized cloth to form a single entity.

The several components shown in FIG. 2 which form the insulation jacket according to the present invention are held in assembled relationship by marginal draw cord structures, yet to be described.

Figure 3:
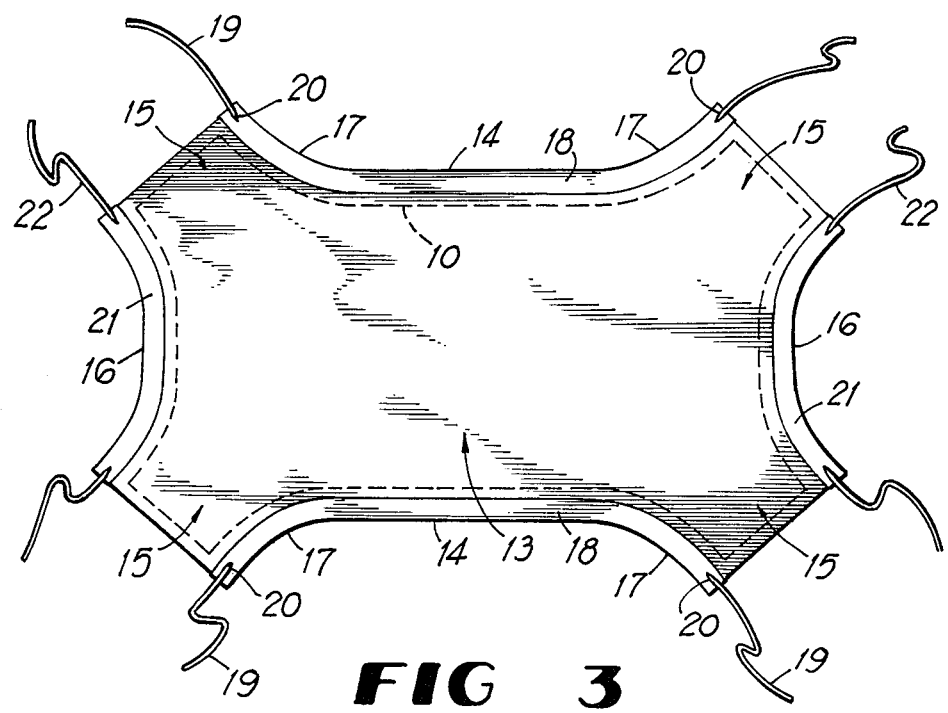
FIG. 3 is a plan view of an insulation jacket for a globe valve according to the invention.

Referring to FIG. 3 showing an insulation jacket for a globe valve, the jacket constructed according to FIG. 2 is flexible and can assume a flat form as depicted in FIG. 3. It includes a somewhat constricted central body portion 13 having parallel longitudinal edges 14. At opposite ends of the body portion 13 are pairs of divergent extensions 15 whose axes are substantially perpendicular and intersect with the longitudinal axis of the insulation jacket to form a symmetrical somewhat elongated structure. The opposite ends of the jacket between the extensions 15 are arcuate as indicated at 16. The parallel edges 14 are joined with the extensions 15 along arcuate edge portions 17.

The one piece insulation layer 10 of the jacket shown in dotted lines in FIG. 3 follows the exterior contours of the body portion 13 and extensions 15.

Tubular draw cords channels or tunnels 18 are formed along the outer margins of body portion 13 and extensions 15 and receive a pair of draw cords 19 which exit from the tunnels 18 as at 20 near their opposite ends. End arcuate draw cord channels 21 are similarly provided at the opposite ends of the jacket between the extensions 15, and receive an additional pair of draw cords 22.

The draw cord channels 18 and 21 are constructed conventionally, as by stitching through the sheets 11 and 12, and thus these channels secure the several layers of the jacket properly assembled with the insulated layer 10 enclosed within the structure.

Figure 1:
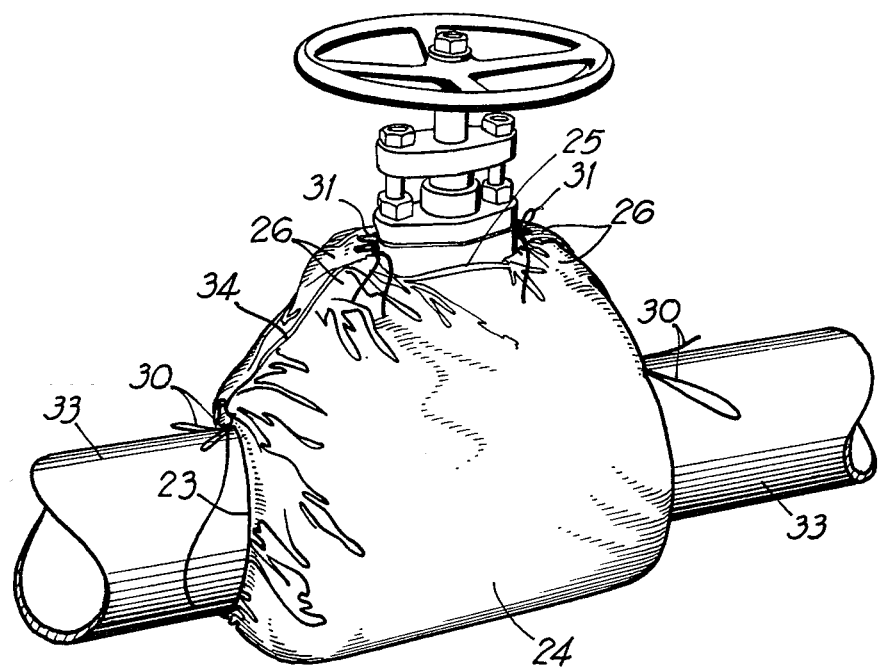
FIG. 1 is a perspective view of a removable insulation jacket for a valve according to one embodiment of the invention.
Figure 4:
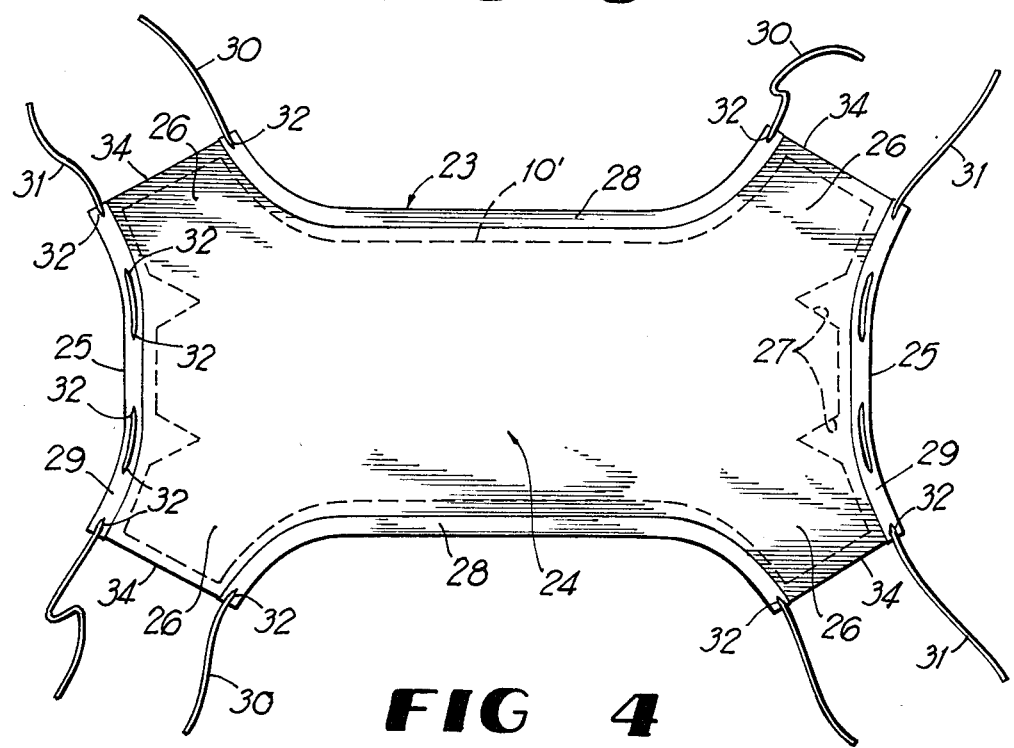

FIG. 4 shows an insulation jacket for a gate valve designated by the numbers 23, such as the valve depicted in FIG. 1. The general construction of the jacket is described in FIG. 3 except for the fact that the central body portion 24 is somewhat more elongated and the opposite end margins 25 of the jacket are less abruptly curved between the divergent extensions 26 and may, in fact, be formed by several straight edge portions as shown in FIG. 4.

The internal insulation layer 10' shown in FIG. 4 is notched in its opposite ends at 27 for better conformability with a gate valve.

Side and opposite end draw cord channels 28 and 29 are provided and receive side and end draw cords 30 and 31, as shown, having exit points 22 from the respective channels.

In use, the insulation jackets shown in FIGS. 3 and 4 are applied removably and snugly to a pipe line valve, as depicted in FIG. 1 for a gate valve. The flexible body portion 24 is wrapped around the bottom of the valve and the parallel edges of the body portion 24 are drawn snugly around the pipe 33 by pulling up and tying the two draw cords 30 as shown in FIG. 1. The divergent extensions 26 are now positioned above the pipe 33 at the top of the gate valve and are drawn together with their end edges 34 substantially in abutment. The contoured opposite ends 25 are drawn snugly around the top stem portion of the valve by means of the draw cords 31. In this manner, as clearly shown in FIG. 1, the flexible insulation jacket completely conforms its shape to the contours of the valve and through the two pairs of draw cords is engaged with the valve and pipe substantially in an airtight manner. The draw cords are much more convenient to manipulate than any known mechanical fastening device and render the jacket more readily conformable to valves of different manufactures and therefore substantially universal in application. The draw cords are preferably formed of TFE resin coated fiberglass cord or equivalent material. The sewing thread used in the formation of the draw cord channels is also preferably TFE resin coated glass thread. Possible alternative materials are ceramic threads, aramid fiber thread, and staples.

Figure 5:
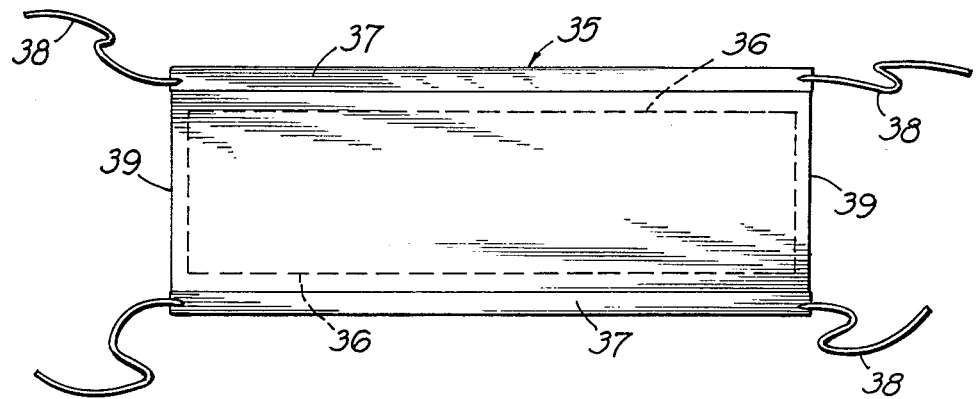
FIG. 5 is a plan view of an insulation jacket for a pipe flange according to the invention.

In FIG. 5, and insulation jacket for a simple flange fitting in a pipe line is shown. This flexible jacket 35 is shown in a flat state before its application to a fitting. It is rectangular and elongated and contains a unitary insulation layer 36 in accordance with FIG. 2 held between two parallel opposite side draw cord channels 37 formed by stitching. These channels receive a pair of draw cords 38, as shown. The construction of the jacket 35 is otherwise as described in connection with FIG. 2. It includes the elements 11 and 12 shown in FIG. 2.

In use, the jacket 35 is simply wrapped around a flange fitting which is basically cylindrical, and the two draw cords 38 are pulled up tight and tied so that the end edges 39 of the insulation jacket are substantially in abutment.

Figure 6:
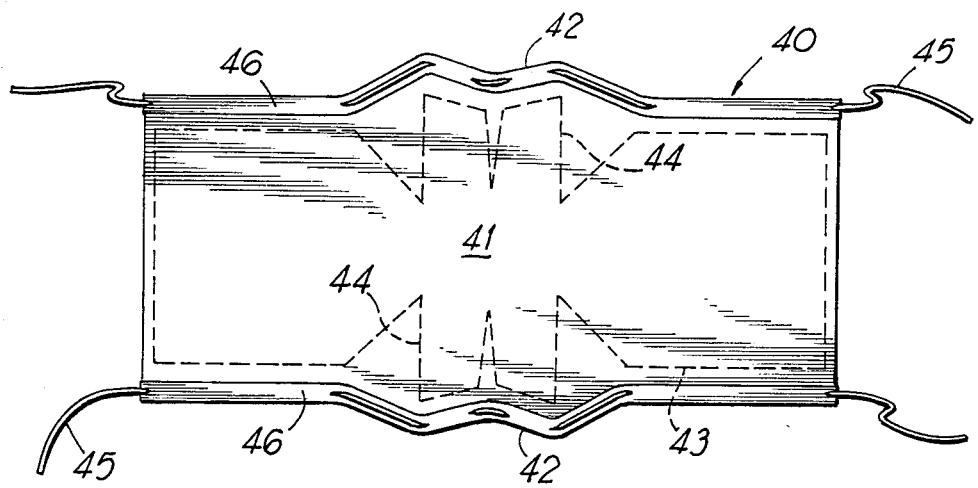
FIG. 6 is a similar view of an insulation jacket for a check valve.

In FIG. 6, an insulating jacket 40 for a check valve is shown and this jacket differs from the jacket 35 mainly in that it is widened in its center area 41 and has opposite side undulating edges 42 to enable the jacket to conform more readily to the contours of typical check valves. The internal insulation layer 43 is notched in these areas as shown at 44 for better conformability when the jacket is applied around a valve. Like the jacket 35 in FIG. 5, the jacket 40 has two draw cords 45, held in two opposite side draw cord channels 46.

Figure 7:
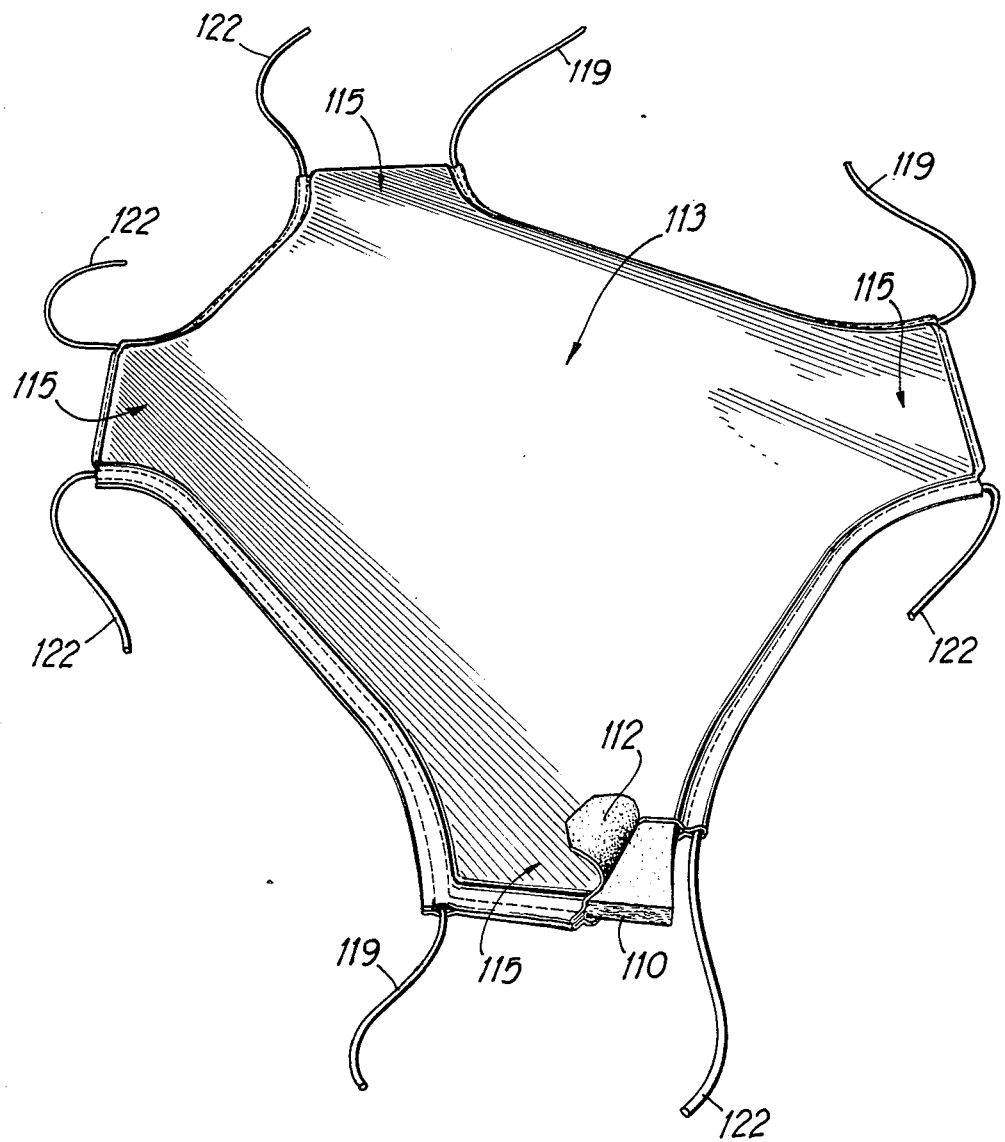
FIG. 7 is a partially cutaway perspective view of a removable insulation jacket according to an alternate embodiment of the invention shown in FIGS. 2 and 3.

An alternate embodiment of the present invention for a globe valve is shown in FIG. 7. That embodiment of the insulation jacket is similar to the jacket in FIG. 3 in that it includes a somewhat constricted central body portion 113, divergent extensions 115, draw cords 119 and 122 and insulation layer 110. In lieu of aluminized fiberglass cloth the cover sheets 112 are formed of a silicone rubber coated fiberglass cloth. Other reasonably high temperature resisting textiles may also be employed as the cover sheets.

Where possible the channels for the draw cords are formed by stitching along a fold in the cover sheet 112. The remaining channels are formed by double stitching a but seam along the edges of the cover sheets. The sewing thread can be of PTFE impregnated glass fiber thread and the draw cords can be of PTFE coated glass fiber. An alternative material for the insulation layer 10, 110 is a felt formed of aramid fibers. A blanket of ceramic material can also be employed.

It should now be evident that according to the invention a unitary, non-modular flexible and readily conformable thermal insulating jacket for various valves and pipe fittings is provided. The jacket is removably held in very snug relationship around a valve or fitting by a system of marginal draw cords and without the necessity for other types of mechanical fastener elements. The overall construction of the jacket is characterized by simplicity and economy in manufacturing and usage, as well as convenience. The use of the invention saves a great deal of time and labor on a comparative basis with prior art multi-component structures including structures which are not entirely flexible and which do not have the ability to assume completely flat conditions prior to installation.

The use of draw cords for securing the jacket removably is a very essential element of the invention which enables the jacket to have an almost airtight mounting on a valve or fitting.

It is to be understood that the forms of the invention herewith shown and described are to be taken as preferred examples of the same, and that various changes in the shape, size and arrangement of parts may be resorted to, without departing from the spirit of the invention or scope of the subjoined claims.

We claim:

1. A thermally insulating jacket for valves and other fittings, which is readily removable, comprising a substantially flexible unitary jacket body portion, having a substantially flat configuration before application to a valve or other fitting and being readily conformable to the diverse contours of a valve or fitting when wrapped around the same, said jacket body portion having at least a pair of opposite sides and at least a pair of opposite side draw cords operable to draw the jacket into snug surrounding engagement with a valve or fitting, said jacket body portion having at least three layers with upper and lower cover layers and an insulative layer disposed between said upper and lower layers and having a continuous outer margin formed by said cover layers with said insulative layer being recessed from said margin, and being provided along said margin with channels for receiving said pair of draw cords, said cords having end portions emerging from the opposite ends of the channels.

2. A thermally insulating jacket as defined in claim 1, and sad body portion being generally rectangular and elongated and including a generally rectangular central portion and pairs of divergent axis extensions on opposite ends of the rectangular portion.

3. A thermally insulating jacket as defined in claim 1, and said end margins and the draw cord channels therealong being substantially arcuate and inwardly recessed from the ends of the insulating jacket.

4. A thermally insulating jacket as defined in claim 3, and the draw cord channels being substantially tubular.

5. A thermally insulating jacket as defined in claim 1, and said body portion comprising an interior relatively thick layer of thermal insulation, and at least two opposite side exterior comparatively thin flexible cover layers.

6. A thermally insulating jacket as defined in claim 5, and the cover layers comprising textile sheets.

7. A thermally insulating jacket as defined in claim 6, and said layer of thermal insulation comprising a mechanically needled fiberglass insulation layer, and said textile sheets comprising metallized cloth.

8. A thermally insulating jacket as defined in claim 7, and the metallized cloth comprising aluminized fiberglass cloth.

9. A thermally insulating jacket as defined in claim 1, and said body portion comprising an interior relatively thick insulation layer, and a pair of opposite side exterior textile cover layers.

10. A thermally insulating jacket as defined in claim 9, and a pair of intermediate flexible backing layers between the insulation layer and textile cover layers.

11. A thermally insulating jacket as defined in claim 10, and said intermediate flexible backing layers comprising silicone rubber sheets.

12. A thermally insulating jacket as defined in claim 11, and said exterior textile cover layers comprising sheets of metallized cloth.

13. A thermally insulating jacket as defined in claim 12, and said relatively thick insulation layer comprising a compliant fibrous layer.

14. A thermally insulating jacket for valves and the like comprising a flexible, compliant body portion having a substantially flat form prior to application to a valve or the like, said jacket having end portions extending laterally from said body portion and having at least two layers with an insulative layer and a cover layer disposed around said insulative layer, said body and end portions having at least a pair of opposite side margins and being provided along said opposite side margins with draw cord tubular channels formed by said cover layer at said side margins and flexible draw cords disposed within said channels, said draw cords having opposed ends projecting outwardly from said end portions for interconnection around a valve, and said insulative layer being recessed from said marginal edge.

15. A thermally insulating jacket for valves and the like comprising a unitary body portion having laterally extending end portions integral therewith, said body and end portions composed of an insulative material and having a continuous margin defined by the periphery of said body and end portions with a tubular channel formed in said margin, said channel having draw cord means disposed therein for securing said body and end portions around valves and the like.

16. A thermally insulating jacket as defined in claim 15 in which said insulative material is recessed from said margin for drawing said margin tight around valves and the like.

* * * * *